United States Patent [19]

Bertram et al.

[11] Patent Number: 4,803,390

[45] Date of Patent: Feb. 7, 1989

[54] DUAL MOTOR DRIVE ARRANGEMENT FOR A SMALL DOMESTIC APPLIANCE

[75] Inventors: Leo Bertram, Stolberg, Fed. Rep. of Germany; Hugo Schemmann, Schaesberg, Netherlands; Romuald L. Bukoschek, Klagenfurt, Austria

[73] Assignee: U.S. Philips Corporation, New York, N.Y.

[21] Appl. No.: 122,982

[22] Filed: Nov. 19, 1987

[30] Foreign Application Priority Data

Nov. 26, 1986 [DE] Fed. Rep. of Germany ....... 3640397

[51] Int. Cl.$^4$ .......................... H02K 7/14; H02K 51/00
[52] U.S. Cl. .......................... 310/50; 74/661; 310/112
[58] Field of Search ................ 74/661, 665 B; 310/50, 310/83, 112, 114, 118; 366/901

[56] References Cited

U.S. PATENT DOCUMENTS

| 3,168,665 | 2/1965 | Holper | 310/118 |
| 3,460,610 | 8/1969 | Baker | 74/665 B |
| 4,691,119 | 9/1987 | McCabria | 310/112 |

Primary Examiner—Patrick R. Salce
Assistant Examiner—D. L. Rebsch
Attorney, Agent, or Firm—F. Brice Faller

[57] ABSTRACT

Two drive motors (251) drive the shaft of a load via a common drive wheel (19), either directly or via further gear wheels. The rotor shafts of the drive motors are constructed as two-pole single-phase synchronous motors having permanent-magnet rotors. The gear wheels mounted on the rotor shafts are oriented in such a way relative to the direction of magnetic polarization of the rotor magnets that when the arrangement is assembled and in mesh, the magnetic orientation of both rotors (27) relative to the main direction of the stator fields is the same for a positive stator current.

11 Claims, 4 Drawing Sheets

DUAL MOTOR DRIVE ARRANGEMENT FOR A SMALL DOMESTIC APPLIANCE

BACKGROUND OF THE INVENTION

The invention relates to a drive arrangement for a small electrically driven appliance, such as a mincer, a shredder, a pump or a hobby appliance, in which two drive motors drive the work shaft of a load via a common drive wheel.

Small domestic appliances, for example citrus juice extractors, and can openers are driven by two-pole single-phase synchronous motors of compact construction and a high power per volume, typically low of output power on the rotor shaft. When the number of different motor types to be manufactured is limited, the production of these motors can be automated to minimize production cost. However, motors manufactured in mass-production quantities should have a range of output powers suitable for a complete series of appliances.

Doubling of the rotor-shaft power output cannot be achieved by just scaling-up the dimensions to obtain twice the power output. A new production line must be set up, with new or modified machines for manufacturing the laminations, winding the coils etc. Of such a motor can be used only for one specific product in limited quantities and not for a whole range of products, the cost for a new automated production line is not justified.

From EP Patent Application No. 127,050 it is known to drive a kitchen machine with at least two electric motors which cooperate with a common worm wheel via worm shafts. Such worm wheels exhibit a substantial degree of self-braking and thus lead to a low power consumption. If for reasons of power and cost the drive motors are constructed as single-phase synchronous motors, in the case of a high drive shaft load synchronous motors will fail to start. In the case of an arbitrary construction and arrangement of such a multi-motor drive using single-phase synchronous motors, starting of the appliances is difficult and often impossible. The appliance rather performs an irregular movement with much noise and vibrations, or even completely fails to start.

SUMMARY OF THE INVENTION

It is the object of the invention to construct a drive arrangement with such low friction that single-phase synchronous motors can be used as drive motors, and further to guarantee a reliable starting and operation.

This object is achieved using a low-friction spur-gear mechanism comprising a drive gear wheel, which is coupled to the load directly or via further gear wheels, and gear wheels, which mesh with the drive gear wheel and are mounted on the rotor shafts of all the drive motors. The motors are constructed as two-pole single-phase synchronous motors with permanent magnet rotors, the gear wheels mounted on the rotor shafts being oriented in such a way relative to the direction of magnetic polarization of the rotor magnets that, when the arrangement is assembled and in mesh, the magnetic orientation of all the rotors relative to the main direction of the stator fields is the same for a positive stator current. This ensures that when the stator coils are not energized in the assembled and meshed condition, the rest position $\theta=\theta_o$ established on account of the magnetic detent torque is maintained, where $\theta$ is a coordinate which characterizes the angular rotor position relative to the main direction of the stator field. All the motors experience a torque in the same direction when the voltage is applied. $\theta$ is zero if the direction of magnetization of the rotor and the main direction of the stator field are antiparallel. A positive stator current then causes the rotor to rotate in the positive direction. The positive direction is that direction in which when the rotor is rotated the permanent-magnet flux linking with the coils is initially maximal and subsequently, after rotation through a small angle, the magnetic detent torque, which is also experienced by the motor when the stator coils are not energized, becomes 0, the rotor occupying a stable rest position. The lines connecting the rotor gear wheel axes to the drive (intermediate) gear wheel axis enclose an angle $\alpha$ which is a multiple $n'$ of the pitch angle $\alpha_2$, the itch angle $\alpha_2$ of the drive gear wheel being $$\alpha_2 = \frac{\pi m}{r_2},$$

where $r_2$ is the radius of the drive gear wheel and m is its module (see below), $n'$ being selected in such a way that the rotor gear wheels do not interfere with each other in operation, while the value of $n'$ can be derived from the relationship $$\frac{\pi}{90} \arcsin \frac{\frac{mz_1}{2} + K}{\frac{m}{2}(z_1 + z_2)} < n'\alpha_2 < 2\pi - \frac{\pi}{90} \arcsin \frac{\frac{mz_1}{2} + K}{\frac{m}{2}(z_1 + z_2)}$$

where
 $z_1$ = the number of teeth of a motor gear wheel,
 $z_2$ = the number of teeth of the common drive gear wheel,
 K = the whole depth of the teeth, and
 $n'$ need not be an integer, all the length dimensions being expressed in mm.

The value of $n'$ also depends on the orientation of the central stator axes and on the arrangement of the gear wheels on the rotors and need not be an integer.

This enables the rotors of at least two single-phase synchronous motors to cooperate with a common drive wheel. For example, if the desired overall power is 20 W, the single-phase synchronous motors may each have a rated output power of 10-W and may be more current 10-W motors manufactured in mass-production quantities. If the rotor configurations with respect to the main axes of the stator fields, the gear-wheel orientation on the rotors and the coil connections relative to one another are observed, a correct starting and operation will be guaranteed.

Care must be taken that dimensioning is effected in conformity with the basic rules for drive mechanisms. For a given circular pitch $t_o$, which complies with $$t_o = \alpha_1 r_1 = \alpha_2 r_2,$$

and a transmission ratio ü, equal to $$ü = r_1/r_2,$$

this yields $$\alpha_2 = \alpha_1 \ddot{u}$$

Here $\alpha_1$ is the pitch angle of the rotor gear wheels, which complies with $$\alpha_1 = \frac{\pi m}{r_1},$$

and $\alpha_2$ is the pitch angle of the drive gear wheel, which complies with $$\alpha_2 = \frac{\pi m}{r_2}$$

where $r_1$ is the radius of the pitch circle of the rotor gear wheels, $r_2$ is the radius of the pitch circle of the drive gear wheel, and m is the module.

For a given orientation of the central stator axes the gear wheels should be mounted on the rotors so that these gear wheels can mesh with the drive gear wheel when the rotors in all the motors are oriented identically relative to the main stator-field direction, i.e. for the same angle $\theta$. This also applies to the rest position angle $\theta = \theta_o$, which the rotors occupy freely if no current flows.

Satisfactory operation is possible as long as this requirement is met for the angle $$\alpha = n\ddot{u}\alpha_1.$$

The stators may be rotated out of these positions through arbitrary angles in the case of identical positions of the gear wheel axes, provided that they are rotated in the same direction and to the same extent.

For a specific orientation of the gear wheels on the rotors a rotation of the rotor gear wheels in an arbitrary direction through the pitch angle $\alpha_1$ or an integral multiple k thereof and a simultaneous rotation of the associated stators in the same direction as the associated gear wheel, the positions of the gear-wheel axes being maintained, this will not affect the conditions for meshing and the position of the direction of magnetization of the rotor relative to the main direction of the stator field. A rotation through an integral multiple k of the pitch angle $\alpha_1$ in an arbitrary direction thus enables the stators to be positioned favorably relative to each other and inside the appliance.

U.S. Pat. No. 4,208,620 describes how two high-power synchronous motors having wound rotors cooperate with a common spur gear. The friction torques and dynamic behavior of these motors do not give rise to starting problems because these motors are brought up to speed by means of external drives or auxiliary coils. The uniform load distribution between the two motors is a problem which is solved by means of compensation coils.

In a further embodiment each rotor the gear wheel on the driving end of the rotor shaft in all the motors has the same tooth orientation relative to the direction of magnetization of the rotor magnet during manufacture. This ensures that all the gear wheels on the individual rotor shafts have a fixed tooth orientation relative to the direction of magnetization of the rotor magnets. If for a given geometrical position of the gear wheel axes the tooth geometry of the common drive gear wheel is now such that the gear wheels on the individual rotor shafts are not rotated when brought into engagement with the common gear wheel, the magnetic orientations of the individual rotors, when the stator coils are connected correctly, are also well adapted to each other in the assembled condition of the complete drive arrangement.

In an arrangement in which the connecting lines from the rotor gear wheel axes to the drive gear wheel axis and the central stator axes have the same direction, the central stator axes form an angle equal to the angle $\alpha$ with each other. The two rotor gear wheels are symmetrical about the bisector of the angle $\alpha$. For the teeth of the rotor gear wheel to mesh correctly with the drive gear wheel, the factor n can only be an integer and the angle $\alpha$ can assume only discrete values which depend on the pitch angle $\alpha_1$, the transmission ratio $\ddot{u}$ and the factor n.

$$\alpha = n\ddot{u}\alpha_1 = n\alpha_2,$$

where n is an integer. Obviously, a rotation out of this basic position as described above remains possible.

For such a symmetrical arrangement with the gear wheels mounted identically on the rotor, if the dimensioning of the rotor gear wheels with respect to m, $r_1$ and $\alpha_1$ is given for a given fixed transmission ratio $\ddot{u}$ the drive gear wheel can be dimensioned simply, by an appropriate choice of the factor n. The angle $\alpha$ and the distances between the gear wheel journals then closely approximate the desired geometry.

Similarly, for a given angle $\alpha$ and a given rotor-gear wheel dimensioning the geometry can be adapted to specific requirements by a suitable choice of the factor n and by adaptation of the transmission ratio $\ddot{u}$. The transmission ratio is then $$\ddot{u} = \frac{\alpha}{n\alpha_1}.$$

The situation becomes more intricate if the direction of the central stator axes is prescribed in such a way that these axes are symmetrical about the bisector of the angle between the connecting lines of the rotor-gear wheel axes and the drive gear axis but form an angle $\epsilon$ which is not equal to $\alpha/2$ with the bisector. If the angular deviation relative to the $\alpha$-direction is $\beta$, the following relationship is valid $$\frac{\alpha}{2} = \beta + \epsilon.$$

The angle $\beta$ can be divided into an integral multiple k of the pitch angle $\alpha_1$ and a residual angle $\delta$, so that:

$$\frac{\alpha}{2} = k\alpha_1 + \delta + \epsilon$$

(If $\epsilon$ $\alpha/2$, $\beta$ must be negative).

Only if $\delta$ is zero and $\alpha_1$ and $\epsilon$ are given the requirements $$\alpha = n\alpha_1\ddot{u}$$

and $$\alpha = 2k\alpha_1 + 2\epsilon$$

can be met symmetrically for both rotor gear wheels by a suitable choice of k and n so as to obtain the same rotor orientation relative to its direction of magnetization inside the stator bore. For this purpose one rotor gear wheel should mesh with an angular displacement relative to the initial position $2\epsilon = \alpha$ through an integral multiple k of the pitch angle $\alpha_1$ in the positive direction of rotation of the rotor and the other gear wheel through a multiple k of the pitch angle $\alpha_1$ in the negative direction. Consequently, the central stator axes are rotated relative to the bisector through the same integral multiple of the pitch angle $\alpha_1$ in the positive and the negative direction. The factor k may then have different values for the two motors. However, the central stator axes are then no longer symmetrical about the bisector of $\alpha$.

In conformity with the foregoing either the angle $\alpha$ or the angle $\epsilon$ must be adapted to meet the above requirements. Moreover, the transmission ratio must have the value prescribed there.

If the angle $\alpha$ is given, the angle $\epsilon$ and hence the direction of the central stator axis for a given pitch angle $\alpha_1$ can no longer be chosen freely. Conversely, in the case of a fixed $\alpha_1$, a given $\epsilon$ will dictate the angle $\alpha$ except for the factor k. The special case $$\alpha = 2\epsilon$$

is obtained for $k=0$.

The transmission ratio $$\ddot{u} = \frac{\alpha}{n \; \alpha_1}$$

should be brought in closest approximation to the desired value by a suitable choice of n. Here n is an integer.

In the case that the central stator axes extend parallel to the bisector and $\epsilon$ is consequently zero, this yields:

$$\ddot{u} = \frac{2k}{n}$$

In this case $\alpha$ is determined by the relationship $$\alpha = \frac{2k \; m\pi}{r_1}$$

Here k and n are integers.

If $\alpha$ is given the above requirements can be met by an appropriate choice of the module m or by correspondingly varying the radii of the rotor gear wheels and the drive gear wheel by the same factor.

This means that only a limited number of permissible transmission ratios are possible independently of the further design.

If these rules are not adhered to the rotors are also rotated inside the stators when the gear wheels are in mesh and phase shifts arise between the torques of the two motors, so that in general a less favourable situation is obtained. The overall critical detent torque in the rotor position in which the overall current torque is zero decreases and the stalling power of series-connected motors is also reduced. Gear load and noise also increase because the motors partly counteract each other. However, on the other hand the overall torque fluctuations acting on the load can then be reduced by a suitable choice of the angular displacement.

It is obvious that depending on tolerances and clearances operation is also possible if the gear wheels are not perfectly in mesh, i.e. if the above rules are not fully complied with. However, it is advisable to adhere to these rules whenever possible. Small deviations in the construction, however, are based on the same basic relationships.

The above considerations also apply to nonsymmetrical arrangements. In this case it is also possible to derive rules based on the above basic relationships.

In particular in all cases in which the two angles $\alpha$ and $\epsilon$ are given and $\delta$ is not zero, the requirements for meshing can be met by angularly displaced positions of the rotor gear wheels on the rotors. Similarly, by adapting the angle $\alpha$ to the direction of the central stator axes the requirements for meshing can be met when the angles $\theta$ are equal for both motors.

In a further embodiment of the invention the motors are provided with markings identifying their polarizations. In this way it is possible to preclude incorrect assembly on the production line.

In a further embodiment of the invention, when motors constructed for 110 V are used with an operating voltage of 220 V, the windings of two motors can be connected in series for a 220 V line voltage. By changing from series to parallel arrangement operating voltages of 220 V and 110 V are possible without modifying the windings. For the export of appliances to countries with a local mains voltage of 110 V, adaptation is therefore possible with a minimal technical effort, without the need of basically modifying the unitary motors manufactured on the production line.

In accordance with the invention a method of assembling a drive arrangement of the type defined in the foregoing is characterized in that, before they are coupled, the rotors are brought into the desired orientation with respect to the stator geometry by means of a direct voltage pulse. This ensures that motors with similarly oriented rotor positions can be obtained fully automatically during assembly, assembly being facilitated by an optical check by means of the color marking which indicates the direction of polarization of the rotor.

DETAILED DESCRIPTION OF THE PREFERRED EMBODIMENT

Figure 1:
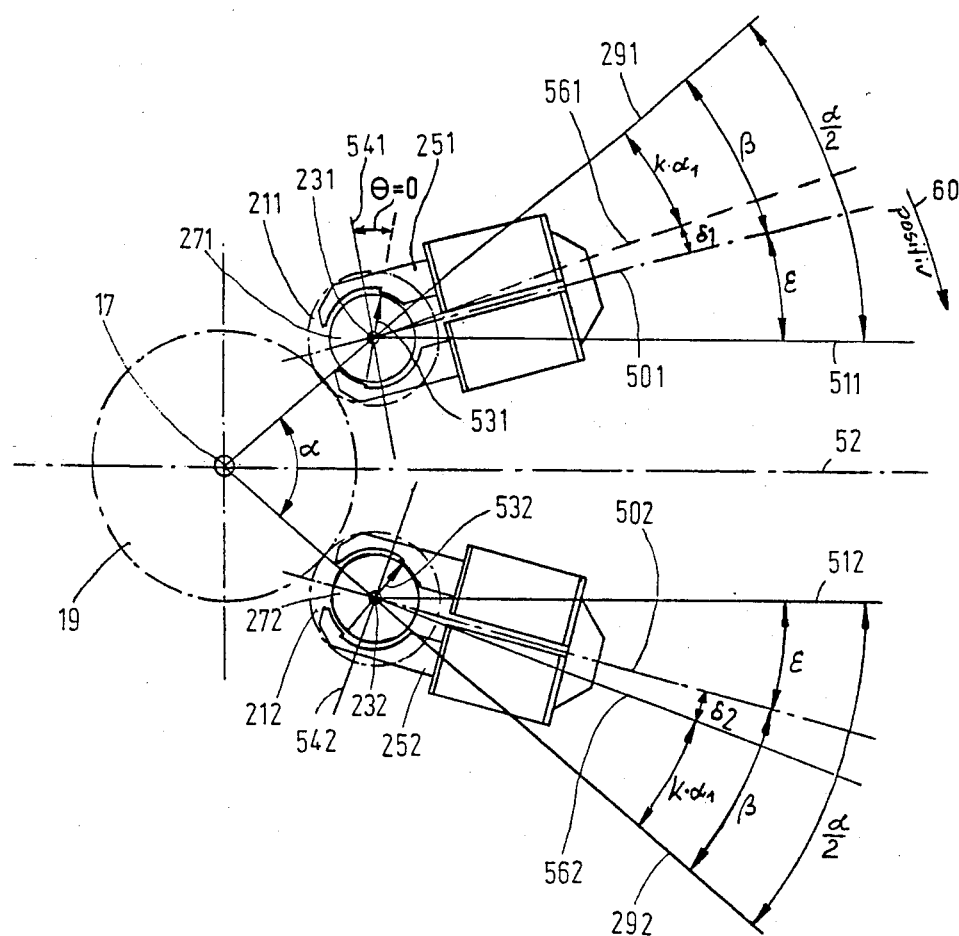
FIG. 1 is a basic diagram of illustrating the angular relationships in the motor gear-wheel arrangement.

FIG. 1 shows the angles $\beta$, $\epsilon$ and $\delta$ and the direction of rotor magnetization 531/532 relative to the magnetic stator field direction 541/542 in the rest position of the rotor when $\theta = \theta_o$. The angle $\beta$ is formed between the lines 291/292 connecting the axis 17 of the drive gear wheel 19 the central stator axes 501/502 of the motors 251/252.

The lines 511/512 extend through the axes 231/232 of the gear wheels 211/212 and parallel to the bisector 52 of the angle α. As is illustrated, the angle ε is formed between the central stator axes 501/502 and the lines 511/512 parallel to the bisector 52.

In comparison with the symmetrical normal position, in which the central stator axis 501, 502 extends in the same direction as the line 291, 292 connecting the gear-wheel axis 17 and the motor gear-wheel axes 231,232, the central stator axis 501 of the synchronous motor 251 is rotated relative to the line 291 connecting the axes 17 and 231 through an angle β in a positive direction indicated by an arrow 60, which angle β is an integral multiple k of the pitch angle $\alpha_1$ if the angular deviation δ=0. The gear wheel 211 and hence the associated rotor 271 and its direction of magnetization 531 are then also rotated through the same integral multiple k of the pitch angle $\alpha_1$ in the positive direction.

The central stator axis 502 of the synchronous motor 252 is also rotated through the angle β, which for a residual angle δ=0 is an integral multiple k of the pitch angle $\alpha_1$, but it is rotated in a negative direction relative to the line 292 connecting the axes 17 and 232. The gear wheel 212 and hence the associated rotor 272 and its direction of magnetization 532 are then rotated through the same integral multiple k of the pitch angle $\alpha_1$ in the negative direction.

A residual angle α is obtained if β is not an integral multiple k of the pitch angle $\alpha_1$. It is the angle between the central stator axes 501/502 and the lines 561/562. When the arrangement is symmetrical and the gear wheels are mounted on the rotors 271/272 in a similar way δ must be zero. Hereinafter, it is assumed that this is the case.

In principle the factor k may be different for the two motors. The direction of rotation is also arbitrary, provided that the rotors carrying the identically mounted gear wheels are rotated in the same direction and through the same angle as the associated stators, so that the angle θ is equal for both motors in the assembled condition. However, the construction is then no longer symmetrical about the bisector.

The connecting lines 291/292 between the rotor gear axes 231/232 of the single-phase synchronous motors 251/252 and the axis 17 of the drive gear wheel 19 enclose an angle α, which in the present case is an integral multiple n of the pitch angle $\alpha_2$ of the drive gear wheel 19. The angle α may be defined as $$\alpha = n \quad \alpha_2 = n \frac{\pi \ m}{r_2}$$

and $$\alpha = n \quad \alpha_2 = n \frac{\pi \ m \ \ddot{u}}{r_1}$$
$$= n \quad \alpha_1 \quad \ddot{u}$$

Here $r_2$ is the radius of the pitch circle of the drive gear wheel 19, $r_1$ is the radius of the pitch circle of the rotor gear wheels 211, 212, ü is the transmission ratio, m is the module (circle diameter per tooth) of the gear wheels, and $\alpha_1$ is the pitch angle of the rotor gear wheels. The factor n must be so large that the gear wheels 211/212 do not interfere during operation. The value of n can be determined from the relationship $$\frac{\pi}{90} \arc\sin \frac{\frac{m \cdot z_1}{2} + K}{\frac{m}{2}(z_1 + z_2)} <$$

$$n' \cdot \alpha_2 < 2\pi - \frac{\pi}{90} \arc\sin \frac{\frac{m \cdot z_1}{2} + K}{\frac{m}{z}(z_1 + z_2)}$$

where $z_1$ is the number of teeth of the gear wheels 211/212, $z_2$ is the number of teeth of the drive gear wheel 19, and K is the whole depth of the teeth.

In the case of a symmetrical arrangement as shown, where the gear wheels are mounted in phase on the magnet rotors n is an integer.

If the two single-phase synchronous motors 251/252 are each designed for a lines voltage of 110 V, they are arranged in parallel. However, if the lines voltage is 220 V, the motors are arranged in series.

Figure 2:
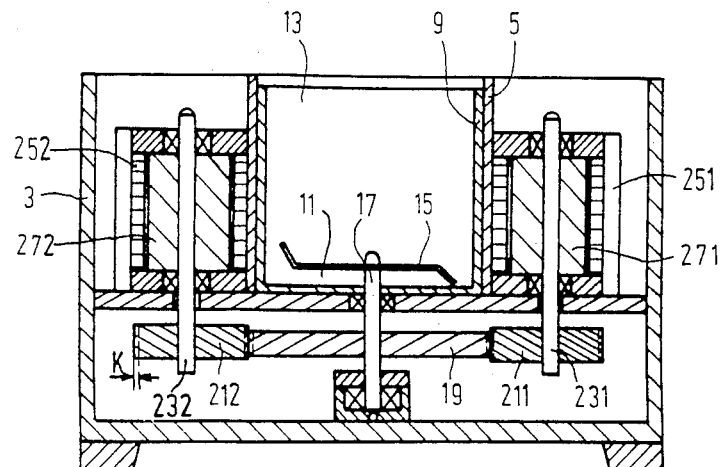
FIG. 2 shows an embodiment comprising two single-phase synchronous motors operating in parallel in a sectional view taken on the line A—A in FIG. 3.

The domestic mincer shown by way of example in FIG. 2 comprises a basic appliance 3 which is provided with a central receptacle 5 which is open at the top to receive a mincer bowl 9. A cutter 15 is arranged to revolve near the bottom 11 of the bowl interior 13 and to be driven by a shaft 17.

The shaft 17 carries a drive gear wheel 19 which is in mesh with the rotor gear wheels 211/212. The rotor gear wheels 211/212 are locked against rotation on the shaft 231/232 of the single-phase synchronous motors 251/252. The shafts 231/232 carry the permanent-magnetic cylindrical rotors 271/272 of the single-phase synchronous motors 251/252.

Figure 3:
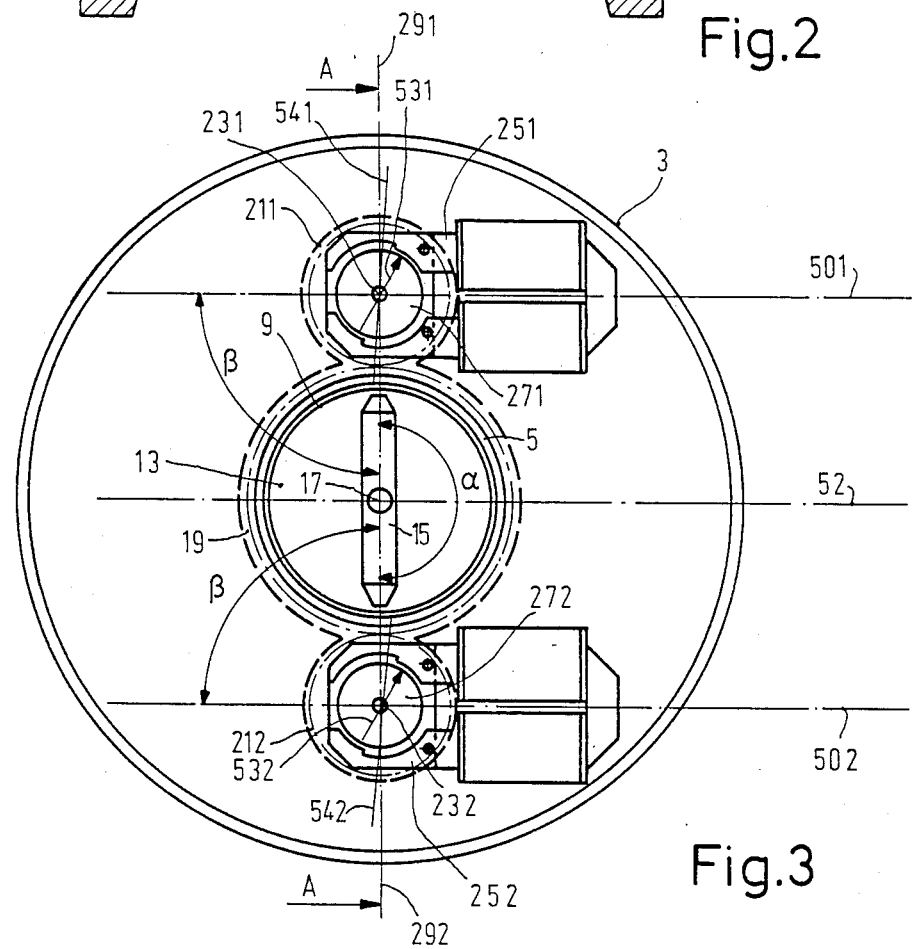
FIG. 3 is a plan view of the embodiment shown in FIG. 2.

For the sake of clarity FIG. 3 shows the embodiment of FIG. 2 in plan view. The drive arrangement of the appliance, comprising the drive gear wheel 19 meshing with the rotor gear wheels 211/212, is constructed to have a low friction by the use of spur gears. The gear wheels 211/212 mounted on the rotor shafts are oriented in such a way with respect to the magnetic polization 531/532 of the rotor magnets 271/272 that, when the arrangement is assembled and in mesh, the magnetic polarization 531/532 of all the rotors 271/272 relative to the main direction of the stator field 541/542 is the same for positive stator current. In the assembled and meshed condition, the stator coils not being energized, the rest position $\theta=\theta_o$ established as a result of the magnetic detent torques must be maintained, θ is a coordinate which characterizes the angular rotor position relative to the main direction of the stator field 541/542. Further, care must be taken that all motors experience a torque in the same direction when the voltage is applied.

In the manufacture of the rotors 271/272 with rotor shafts 231/232 and gear wheels 211/212 it is important that the tooth orientation of the gear wheels 211/212 is adapted to the direction of magnetization 531/532 of the rotor magnets 271/272. During mounting of the rotor shafts the tooth orientation and the rotor magnet orientation 531/532 can readily be adapted to one another in a magnetic device. It is then possible to ensure that all the gear wheels 211/212 on the individual rotor shafts 231/232 have the desired orientation of the teeth relative to the direction of magnetization 531/532 of the rotor magnets 271/272.

Care must be taken that during assembly the gear wheels 211/212 on the individual rotor shafts 231/232 are not rotated into an undesired angular position relative to the drive gear wheel 19, in order to ensure that the positions of the individual gear wheels 211/212 and the associated orientation of the rotor magnetization 531/532 are well adapted to the main stator field direction 541/542.

In the present example the dimensioning data are as follows: $\alpha=180°$, $\beta=90°$, $\epsilon=0$, $\delta=0$, $k=7$, $n=28$, $\ddot{u}=1:2$, $z_1=28$, $z_2=56$, $m=0.8$, $r_1=11.2$ mm, $r_2=22.4$ mm.

Figure 4:
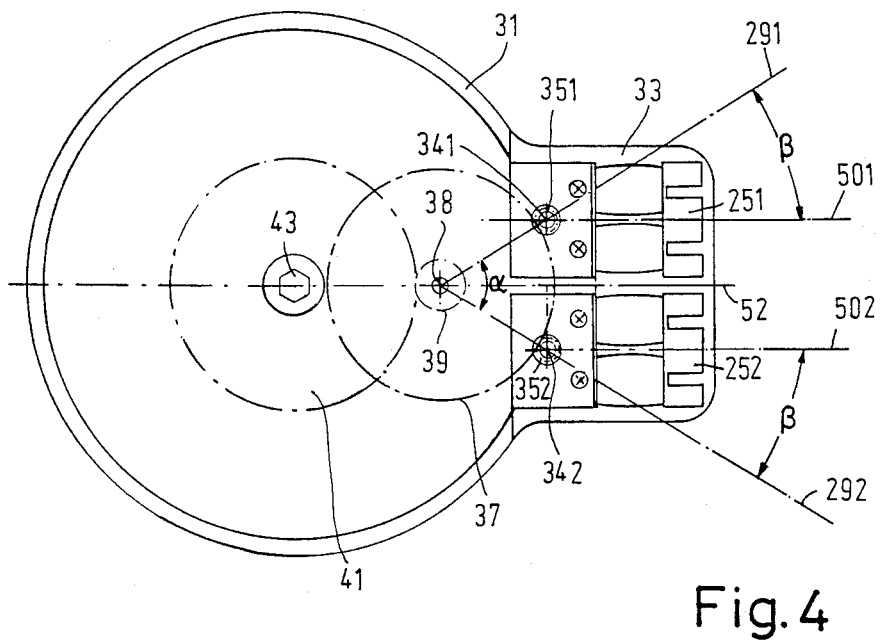
FIG. 4 is a plan view of another embodiment comprising two single-phase synchronous motors operating in parallel.

FIG. 4 shows a citrus-juice extractor. 31 having a handle 33 in which two single-phase synchronous motors 251/252 are arranged parallel adjacent one another. The gear wheels 351/352 of the single-phase synchronous motors 251/252 both cooperate via the rotor shafts 341/342 with an intermediate gear wheel 37, which drives the drive gear wheel 41 for the appliance shaft 43 via a transmission gear wheel 39. The intermediate gear wheel 37 and the transmission gear wheel 39 are rotatable about a common axis 38.

Figure 5:
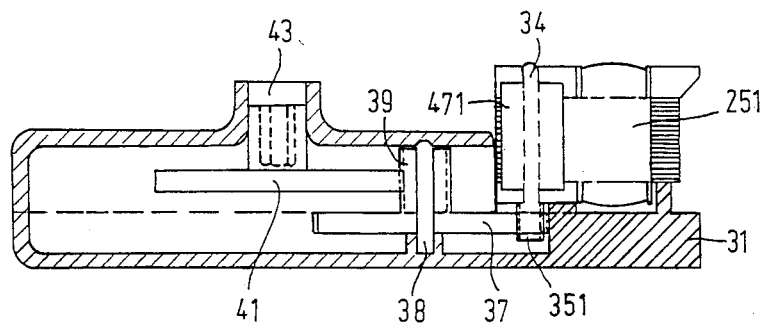
FIG. 5 is a side view of the embodiment shown in FIG. 4.

FIG. 5 is a partly sectional side view of the basic appliance 31, showing one of the synchronous motors 251, the rotor 371 of this single-phase synchronous motor 251, and the transmission gear wheels 351, 37, 39 and 41 of FIG. 4.

The intermediate gear wheel 37 in FIGS. 4 and 5 for the drive system corresponds to the drive gear wheel 19 in FIGS. 1, 2 and 3, the axis 38 corresponding to the axis 17. In FIGS. 4 and 5 the axes 341/342 further correspond to the axes 231/232 and the gear wheels 351/352 correspond to the gear wheels 211/212 in FIGS. 1, 2 and 3.

The lines 291/292 connecting the axis 38 to the axes 341/342 extend at an angle $\alpha$ to one another, whose bisector is the line 52. The central stator axes 501/502 of the synchronous motors 251/252 extend parallel to the bisector 52. Thus the angle $\alpha$ complies with:

$$\beta = \alpha/2,$$

and the angle $\epsilon$ is zero. The rotor gear wheels 351/352 are mounted on the rotors 471/472 of the synchronous motors in the same way, and the transmission ratio complies with:

$$\ddot{u} = \frac{2k}{n}$$

where k and n are integers.

The dimensioning data of the embodiment shown in FIGS. 4 and 5 are as follows: $\alpha=60°$, $\beta=30°$, $\epsilon=0$, $r_1=2.4$ mm, $r_2=19.2$ mm, $\ddot{u}=1:8$, $k=1$, $n=16$, $m=0.4$, $z_1=12$, $z_2=96$.

Figure 6:
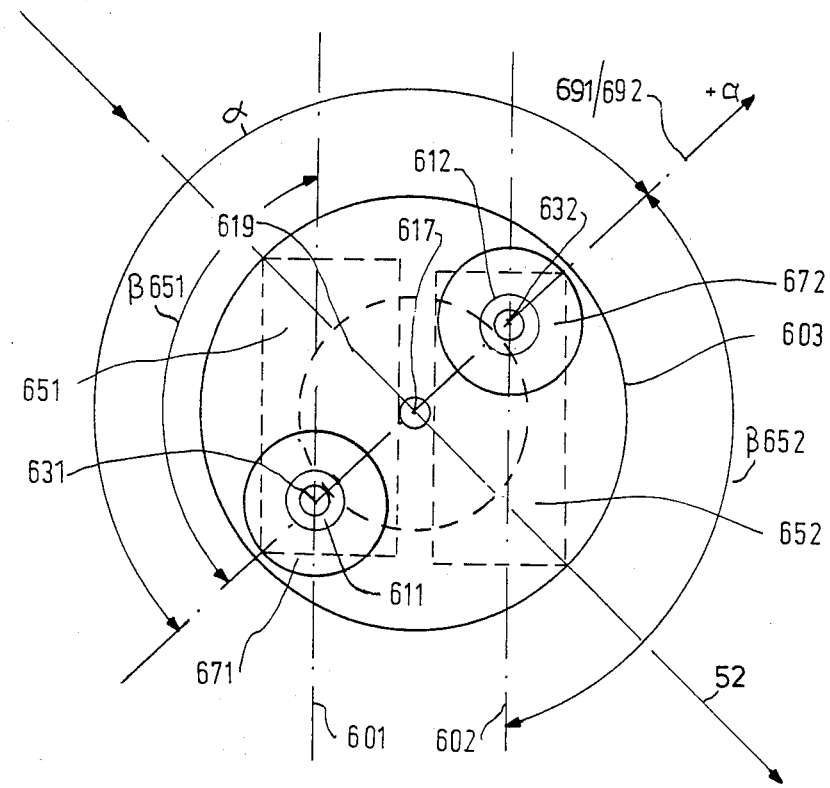
FIG. 6 shows a further embodiment of a twin-motor drive.

FIG. 6 schematically shows the basic construction of a further embodiment in the form of an all-purpose grinder. The synchronous motors 651/652 are arranged in antiparallel in a housing 603. The rotor gear wheels 611/612 mesh with the drive gear wheel 619. In comparison with FIG. 1 this embodiment has the following special dimensioning data:

$$\alpha=180°, \beta=135°, \epsilon=-45°.$$

The lines 691/692 connecting the axis 617 of the drive gear wheel 619 to the axes 631/632 of the motors 651/652 enclose the angle $\alpha$ and are selected as the reference direction for the angular displacement $\beta$. The bisector 52 of the angle $\alpha$ is the reference line for the angle $\epsilon$. In this case both motors are rotated in the same direction through the angle $\beta=135°$ out of the initial position in which the central stator axes 601/602 coincide with the connecting line 692. The angle $\epsilon$ is negative, because the central stator axes 601/602 are rotated through 45° beyond the bisector 52. Again the relationship $$\frac{\alpha}{2} = \beta + \epsilon$$

is met. As described above, both stators can be rotated out of the position described through an arbitrary angle which must be the same for both stators in the same direction, without a correct meshing being affected. The aforementioned other rotation possibilities also remain applicable.

The further data, such as gear wheel radius and module, are selected in such a way that the meshing requirements are met and they may correspond to those of the embodiment shown in FIG. 2 or 4.

What is claimed is:

1. A drive arrangement for a small electrically driven appliance comprising
   a common drive gear wheel which is connected to a load, said drive gear wheel being characterized by a pitch angle $\alpha_2 = \pi m/r_2$, where $r_2$ is the radius of the drive gear wheel and m is its module,
   a pair of two-pole single phase synchronous drive motors each having a stator with a stator field and a permanent magnet rotor mounted on a rotor shaft and having a direction of polarization, each motor having a gear wheel mounted on its rotor shaft and meshing with said common drive gear wheel, the angle $\theta$ between the main direction of the stator field and the rotor field being the same for all rotors for a positive stator current, whereby when the stator coils are not energized the rest position $\theta=\theta_o$ established by the magnetic detent torque is maintained and all the motors experience a torque in the same direction when voltage is applied,
   the lines connecting the rotor gear wheel axes to the common drive gear wheel axis enclosing an angle $\alpha$ which is a multiple $n'$ of the pitch angle $\alpha_2$, the value of $n'$ being derived from the relationship $$\frac{\pi}{90} \arcsin \frac{mz_1/2 + K}{m(z_1 + z_2)/2} < n'\alpha_2 <$$

$$2\pi \frac{\pi}{90} \arcsin \frac{mz_1/2 + K}{m(z_1 + z_2)/2}$$

where
   $z_1$ = the number of teeth of a rotor gear wheel,
   $z_2$ = the number of teeth of the common drive gear wheel,
   $K$ = the whole depth of the teeth, and $n'$ need not be an integer, all the length dimensions being expressed in mm.

2. A drive arrangement as in claim 1 wherein each gear wheel (211/212, 351/352, 611/612) has the same tooth orientation relative to the respective direction of polarization (531/532) of the rotor magnets (271/272, 471/472, 671/672) in all the motors (251/252, 651/652) and the central stator axes (501/502, 601/602) are oriented in such a way that the direction of polarization (531/532) of all the rotors (271/272, 471/472, 671/672) relative to the main direction of the stator fields (541/542) in the case of a positive stator current is the same, and in that all the motors (251/252, 651/652) experience a torque in the same direction when the voltage is applied.

3. A drive arrangement as claimed in claim 2, characterized in that the arrangement is symmetrical about the bisector (52) of the angle $\alpha$ or is rotated relative to this position through an integral multiple k of the pitch angle $\alpha_1$ and also comprises with $$\alpha = n\alpha_1 \ddot{u},$$

and $$\alpha = 2k\alpha_1 + 2\epsilon,$$

n being an integer,
where
  ü is the transmission ratio,
  k is an integral factor 0, 1, 2, ... k, and
  $\epsilon$ is the angle between the central stator axes (501/502, 601/602) and the axes (511/512) parallel to the bisector (52) of the angle $\alpha$.

4. A drive arrangement as claimed in claim 3, characterized in that the angle $\epsilon$ is zero and the transmission ratio $\ddot{u} = 2k/n$, where k and n are integers.

5. A drive arrangement as claimed in claim 1, characterized in that the tooth orientation of one or all the gear wheels (211/212, 351/352, 611/612) relative to the axis of rotor magnetization (531/532) is rotated through an angle $$\delta_{1,2} = \alpha/2 - \epsilon - k\alpha_1$$

relative to the symmetrical normal position in which the gear wheels are identically mounted on the rotors (271/272, 471/472, 671/672) for $$\alpha/2 = k\alpha_1 + \epsilon,$$

and in that the associated central stator axes (501/502, 601/602) are also rotated in the same direction through the same angle $\alpha_{1,2}$ where $\alpha_1$ is the pitch angle of the motor gear wheel which complies with $$\alpha_1 = \frac{\pi \; m}{r_1},$$

K is an integral factor equal to 0, 1, 2, ... k, and $\epsilon$ is the angle between the central stator axes (501/502, 601/602) and the axes (511/512) parallel to the bisector (52) of said angle.

6. A drive arrangement as claimed in claim 1, characterized in that the rotors (271/272, 471/472, 671/672) are provided with a marking identifying their polarization (531/532).

7. A drive arrangement as claimed in claim 1, characterized in that two motors (251/252, 651/652) constructed for 110 V operation are arranged in series for operation on 220 V.

8. A drive arrangement as claimed in claim 1, characterized in that the tooth orientations of the rotor gear wheels (211/212, 351/352, 611/612) relative to the direction of magnetization (531/532) of the rotors (271/272, 471/472, 671/672) are different in such a way that for the desired orientation of the central stator axes 501/502, 601/602) the requirements for the rotor gear wheels (211/212, 351/352, 611/612) to be in mesh with the drive gear wheel (19, 37, 619) are met.

9. A drive arrangement as claimed in claim 4, characterized in that it complies with the following dimensioning data: $\alpha = 180°$, $\beta = 90°$, $\epsilon = 0$, $\delta = 0$, $k = 7$, $n = 28$, $\ddot{u} = 1:2$, $z_1 = 28$, $z_2 = 56$, $m = 0.8$, $r_1 = 11.2$ mm, $r_2 = 22.4$ mm,
where $\beta$ is an angle between the lines (291/292, 691/692) connecting the axis (17, 38, 617) of the drive gear wheel (19, 37, 619) to the axes (231/232, 341/342, 631/632) of the rotor gear wheels (211/212, 351,352, 611/612), and $\delta$ is the residual angle, which follows from $$\delta = \frac{\alpha}{2} - k \; \alpha_1 - \epsilon.$$

10. A drive arrangement as claimed in claim 4, characterized in that it complies with the following dimensioning data: $\alpha = 60°$, $\beta = 30°$, $\epsilon = 0$, $r_1 = 2.4$ mm, $r_2 = 19.2$ mm, $\ddot{u} = 18$, $k = 1$, $n = 16$, $m = 0.4$, $z_1 = 12$, $z_2 = 96$.

11. A drive arrangement as claimed in claim 2, characterized in that it complies with the following dimensioning data: $\alpha = 180°$, $\beta = 135°$, $\epsilon = -45°$.

* * * * *